May 8, 1962     J. P. ALDEN     3,032,975
ROCKET MOTOR

Filed March 25, 1957     2 Sheets-Sheet 1

INVENTOR.
J. P. ALDEN
BY Hudson and Young
ATTORNEYS

May 8, 1962   J. P. ALDEN   3,032,975
ROCKET MOTOR

Filed March 25, 1957   2 Sheets-Sheet 2

INVENTOR.
J. P. ALDEN
BY Hudson and Young

ATTORNEYS

United States Patent Office 3,032,975
Patented May 8, 1962

3,032,975
ROCKET MOTOR
John P. Alden, Princeton, N.J., assignor to Phillips Petroleum Company, a corporation of Delaware
Filed Mar. 25, 1957, Ser. No. 648,438
4 Claims. (Cl. 60—35.6)

This invention relates to rocket motors utilizing solid propellants. In one aspect it relates to an improved solid-propellant grain and to a method and means for bonding the grain to the rocket motor case. In another aspect it relates to an improved internal-burning, case-bonded solid-propellant grain.

The solid-propellant rocket motors of the prior art have been subject to many disadvantages caused by uneven burning of the solid propellant and resulting variations in the pressure and the thrust of the gases emerging from the nozzle of the rocket. If the solid propellant becomes loose in the combustion chamber it is likely to be subject to movement followed by collision with the chamber wall resulting in a sudden breakage of the propellant grain, thus increasing the area of burning and thereby effecting a sudden rise in the pressure within the rocket motor case with attendant danger of an explosion. Internal-burning propellant grains of the prior art present the problem of fixed burning rates during the firing period which precludes obtaining, without excessive sacrifice of volume, the plateau-shaped pressure-versus-time curves which are associated with a propellant grain having proper burning rate characteristics. The final thrust is determined by the external diameter of the grain and the initial thrust is determined by the diameter of the perforation.

It is an object of this invention to provide an internal-burning solid-propellant grain with satisfactory firing characteristics. It is also an object of this invention to provide an improved method and means for securely positioning a solid-propellant grain within a rocket motor case. It is an object of the invention to provide a method for the fabrication of an internal-burning, solid-propellant grain which presents a constantly increasing burning surface at a controlled rate. It is also an object of this invention to provide a method for the fabrication of an internal-burning solid-propellant grain which presents a substantially constant burning surface during the firing of the propellant in a rocket motor. It is a further object to provide an internal burning grain with a large initial burning surface. Other and further objects and advantages of this invention will be apparent to those skilled in this art upon reading the following disclosure of the invention including the drawings.

Broadly, the invention contemplates an internal-burning propellant grain wherein the center perforation of the grain is formed in the shape of a star or the axis and spokes of a wheel. The configuration of the center or coaxial perforation is more accurately described as a plurality of elongated rectangles arranged with one short side of each rectangle coincident with the axis of the grain and with equal angular distance between the rectangles. As a matter of convenience the perforation will be referred to as star shaped, although, as described and illustrated, the configuration of the perforation is distinct from the shape of the conventional star figure. The rectangles can extend from 25 to 75 percent of the distance from the axis to the periphery of the grain but preferably extend at least 50 percent of the distance to the periphery. This will usually provide an initial burning surface about equal to the final burning surface. This configuration of center opening increases the ignition surface of an internal-burning propellant grain and provides a surface whose area will increase only slightly during the firing period. The initial burning surface should be nearly equal to the final burning surface of the grain. All outside surfaces of the grain are restricted except the star areas of both ends; except that in some cases slightly more than the star areas are not restricted. The grain is secured to the case by means of broad strips of resilient and slow burning material which occupy as much as about 50 percent of the external surface of the rocket grain.

The restrictor coating can be any of the inert materials known in the art such as asbestos, glass cloth and the like impregnated with a bonding cement. A preferred restrictor material is rubber impregnated glass cloth bonded to the grain with a rubber base cement.

The grain is bonded to the case by two or more strips of resilient material such as sponge rubber. The strips are bonded to the case and the restrictor covering of the grain with a bonding agent such as rubber base cement. The bonding agent is preferably applied to the case, the strips and the restrictor and the grain is positioned in the case before the bonding agent sets or solidifies.

Figures 1, 2, 3:
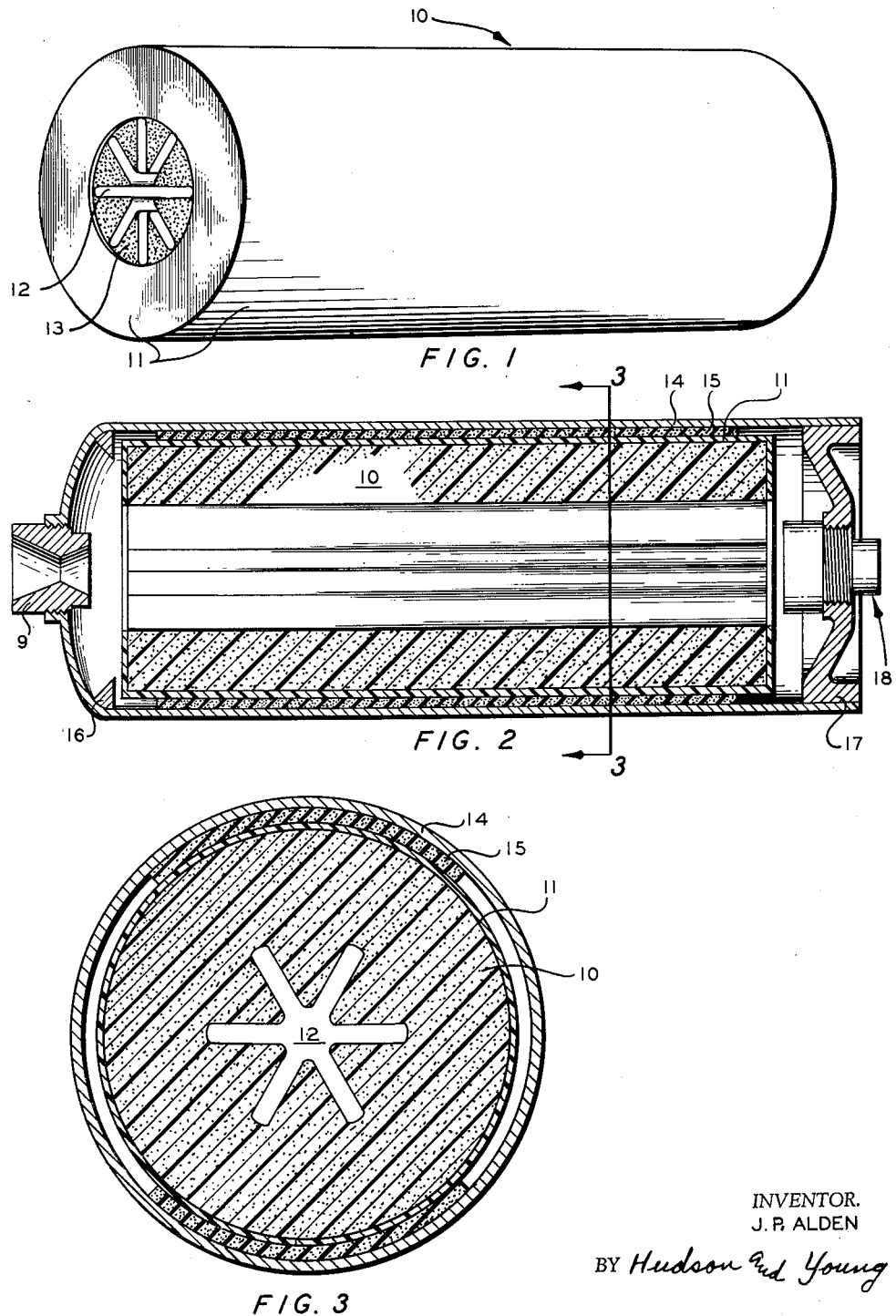
FIGURE 1 is a view of a solid-propellant grain of the present invention.
FIGURE 2 is a sectional elevation of a rocket motor having the solid-propellant grain of this invention positioned therein.
FIGURE 3 is a sectional elevation taken along line 3—3 of FIGURE 2.

In the drawing FIGURE 1 illustrates a propellant grain 10 with restriction material 11 covering the periphery and a portion of the ends. Star perforation 12 and grain end 13 represent the burning surface.

In FIGURE 2 propellant grain 10 is secured in motor case 14 by sponge rubber pads 15 bonded to the motor case and to restrictor material 11. The grain 10 is seated against stops 16. The removable motor case head 17 contains igniter 18. Exhaust nozzle 19 is positioned in the opposite end of the motor from the head 17.

The propellant grain of the invention will be described with reference to the drawing.

In FIGURE 1 a grain is shown restricted around the periphery and on the ends except for the 8-pointed star perforation. In the case of a 9.4 in. diameter grain and a 4.4 star perforation about 75% of the total area of the end of the grain is restricted (ignoring the perforation). The restricted area of the grain ends can be reduced to about 25% of the total end area (ignoring the perforation) in order to increase the initial burning area of the propellant. Some initial restriction of end burning is required in order to maintain sufficient final burning area. In other words end burning should be inhibited at least in part, so as to avoid excessive shortening of the grain during combustion.

The burning rate is substantially uniform over the entire exposed surface, therefore the area of the perforation will increase only slightly during combustion. Thus end burning should decrease the length of the grain only slightly, if at all.

The propellant grain of this invention permits a high volumetric loading of the motor case and results in a minimum of slivers or unburned propellant pieces at burn-out. As much as 96 percent of the volume of the motor case can be utilized to accommodate propellant and unburned propellant pieces after combustion and usually be less than 8 percent. When the propellant grain of this invention is utilized in a rocket motor case, no end plates are necessary because the broad bonding strips provide ample support for the grain and are relatively simple to apply because no burning surfaces are involved in making the bond.

The grain configuration of this invention is applicable to all of the known solid-propellant compositions, however, in the practice of this invention the preferred propellant composition is one comprising 50 to 90 weight percent ammonium nitrate, 10 to 50 weight percent of a rubbery copolymer of a conjugated diene and a polymerizable heterocyclic nitrogen compound, a burning rate catalyst such as milori blue, and various curing agents. One typical propellant composition is shown in the following Table I.

TABLE I

| | Phr | Parts | Total Parts | Percent By Weight |
|---|---|---|---|---|
| Butadiene-methylvinylpyridine copolymer (90:10) 20 Mooney | 100 | | 11.093 | 10.88 |
| Furnace carbon black | 20 | | 2.218 | 2.17 |
| Di-butoxyethoxyethyl formal | 20 | | 2.218 | 2.17 |
| N,N-dimethyl-tert butylsulfenyl dithiocarbamate | 1 | 16.50 | 0.111 | 0.11 |
| Sulfur | 0.75 | | 0.083 | 0.08 |
| Zinc oxide | 3 | | 0.333 | 0.33 |
| Floxamine (trademark)[1] | 3 | | 0.333 | 0.33 |
| Dioctyl ester of sodium sulfosuccinic acid | 1 | | 0.111 | 0.11 |
| Ammonium nitrate[2] | | 83.50 | 83.500 | 81.86 |
| Milori blue | | 2.00 | 2.000 | 1.96 |
| | | 102.00 | 102.000 | 100.00 |

[1] Physical mixture containing 25 percent of a complex diarylamine-ketone reaction product and 35 percent of N,N'-diphenyl-para-phenylenediamine.
[2] Grind to be made at 3,000 r.p.m., 0.094-inch HB screen, and 700 r.p.m screw speed.

Another, and preferred, propellant composition is shown in Table II.

TABLE II

| Ingredients | Parts by Weight |
|---|---|
| Butadiene-methylvinylpyridine | 100 |
| Furnace carbon black | 22 |
| ZnO | 5 |
| MgO | 3 |
| Di-butoxyethoxyethyl formal | 20 |
| Dioctyl ester of sodium sulfosuccinic acid | 1 |
| Ammonium nitrate | 83.5 |
| Milori blue | 2.0 |

(Total: 16.5)

Burning characteristics of the above propellants are shown in Table III.

TABLE III

Motor Data

| | |
|---|---|
| Burning rate @ 1000 p.s.i., in. per sec. | 0.121 |
| Burning rate @ 700 p.s.i., in. per sec. | 0.099 |
| Characteristic exhaust velocity, ft. per sec. | 4064 |
| Pressure exponent | 0.57 |

Laboratory Data

| | |
|---|---|
| Burning rate @ 1000 p.s.i., in. per sec. (strand) | 0.145 |
| Pressure exponent (strand) | 0.49 |
| Young's modulus, p.s.i. | 4100 |
| Ultimate tensile, p.s.i. | 220 |
| Ultimate elongation, percent | 9.7 |

Propellant compositions such as those described above have burning rates in the range of 0.09 to 0.25 inch per second when the rocket motor is operated in the pressure range of 600 to 1200 p.s.i. which is considered a safe and practical operating range for most applications.

The propellant grains of the invention can be prepared by known methods. A preferred method for preparing ammonium nitrate-rubbery copolymer propellant grains is to blend the ammonium nitrate, copolymer, burning rate catalyst and curing agents into a workable mass and to extrude the mass through a suitable die as a cylinder having the desired perforation configuration. The cylinder is then cut into the desired lengths and is cured to solidify the copolymer binder. The curing temperature can be from 70 to 250° F. and is preferably between 170 and 200° F. The curing time will generally range from about 3 hours at the higher temperatures to as much as 14 days at the lower temperatures.

The following example will serve to illustrate the invention but is not to be construed as limiting the invention in any way.

EXAMPLE

A propellant grain having the composition of Table II was fabricated with an outside diameter of 9.4 inches and a six-pointed star perforation, as shown in FIGURE 3, having a radius of 4.4 inches, from the tip of one point to the tip of the opposite point. The periphery and the ends of the grain, from the tips of the perforation, were restricted with rubber impregnated glass cloth bonded to the grain. The grain was 25.25 inches in length. The grain was secured in the motor case by means of two sponge rubber strips 10 inches long, cemented to the grain and the case. The igniter used was that disclosed and claimed in copending application Serial No. 605,905, filed August 23, 1956, by O. D. Ratliff, Jr. The rocket was fired at 60° F. using a 1-inch nozzle and the ballistic data obtained are shown in the following Table IV.

TABLE IV

Motor Data

| | |
|---|---|
| Burning rate @ 641 p.s.i., in. per sec. | 0.126 |
| Burning rate @ 554 p.s.i., in. per sec. | 0.113 |
| Characteristic exhaust velocity, ft. per sec. | 3769 |
| Initial pressure, p.s.i. | 534 |
| Final pressure, p.s.i. | 942 |
| Initial burning area, sq. in. | 598 |
| Final burning area, sq. in. | 578 |

Figure 4:
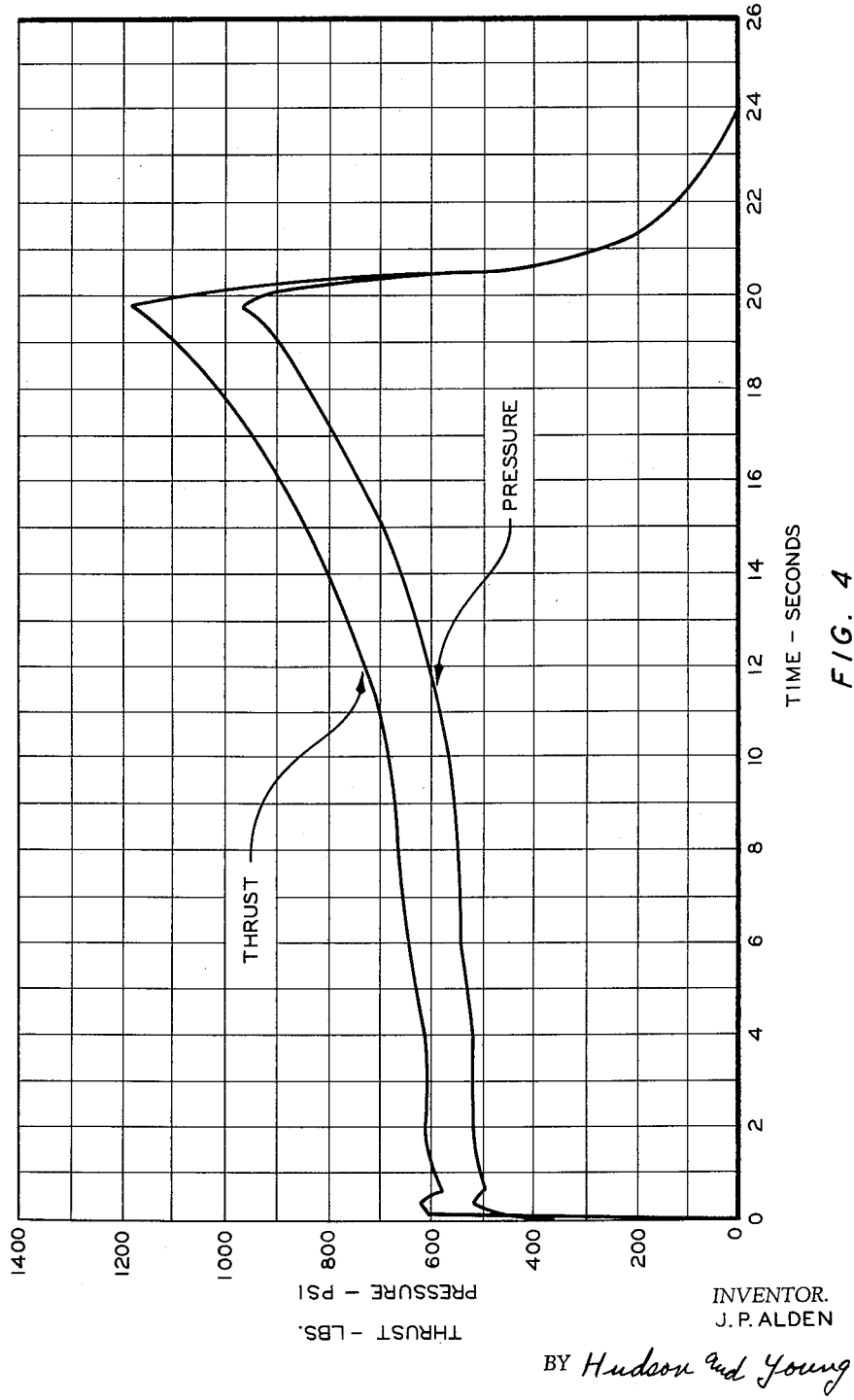
FIGURE 4 is a pressure-time curve obtained from firing the rocket.

The pressure-time and thrust-time curves obtained during firing are shown in FIGURE 4 of the drawing.

The data show increasing pressure and thrust throughout the firing period. The initial pressure and thrust can be raised by reducing the amount of restriction on the ends and the plateau rendered substantially level by increasing the burning area of the perforation, e.g., by increasing the number of points in the star configuration or by increasing the length of the rectangles forming the spokes radiating from the axis. FIGURE 1 shows an 8-pointed star. These modifications can be applied when the length of the grain is fixed.

If there is no restriction as to the length of the grain, the initial burning area can be increased by increasing the length, at constant grain diameter.

The configuration of the perforation, and the end restrictions of the grain of this invention cooperate to provide a flexible control of the firing characteristics of a rocket motor.

Propellant grains fabricated according to the configuration of this invention are characterized ballistically by slightly saddle-shaped pressure-versus-time curves and thrust-versus-time curves. Excessive ignition and burnout peaks do not exist because the grain burns partially on each end.

Variations and modifications are possible within the scope of the disclosure of the present invention, the essence of which is the provision of an internal burning solid propellant grain having a perforation configuration which provides flexibility in ballistics characteristics and provides simplicity in securing the grain in the motor case.

That which is claimed is:

1. A rocket motor comprising a combustion chamber, an exhaust nozzle, an igniter, and an internal burning propellant grain having controllable, progressive burning characteristics wherein the propellant grain has a coaxial perforation the cross section of which is represented by a plurality of elongated rectangles arranged with one short side of each rectangle coincident with the axis of the grain and with equal angular distance between the rectangles; wherein the periphery of the grain and between 25 and 75 percent of the total area of the ends of the grain is coated with an inert material so that the initial burning surface is substantially the same as the final burning surface; and wherein the grain is bonded to the combustion chamber wall with a plurality of strips of resilient and slow burning material as the sole means for supporting the grain in the combustion chamber.

2. The rocket motor of claim 1 wherein the strips of resilient and slow burning material are sponge rubber strips.

3. The rocket motor of claim 1 wherein the elongated rectangles of the perforation extend from the axis of the grain from 25 to 75 percent of the distance to the periphery of the grain.

4. The rocket motor of claim 1 wherein the elongated rectangles of the perforation extend from the axis of the grain at least half way to the periphery of the grain.

References Cited in the file of this patent

UNITED STATES PATENTS

| | | |
|---|---|---|
| 2,539,404 | Crutchfield et al. | Jan. 30, 1951 |
| 2,563,265 | Parsons | Aug. 7, 1951 |
| 2,713,768 | Livingston et al. | July 26, 1955 |
| 2,750,887 | Marcus | June 19, 1956 |
| 2,779,288 | Cohen et al. | Jan. 29, 1957 |
| 2,780,997 | Baker | Feb. 12, 1957 |

FOREIGN PATENTS

| | | |
|---|---|---|
| 17,994 | Great Britain | Sept. 21, 1894 |
| 26,430 | Great Britain | Nov. 29, 1907 |
| 659,758 | Great Britain | Oct. 24, 1951 |

OTHER REFERENCES

A Quasi-Morphological Approach to the Geometry of Charges for Solid Propellant Rockets: The Family Tree of Charge Designs, by J. M. Vogel, Jet Propulsion, vol. 26, No. 2, pp. 102–105, February 1956.